United States Patent [19]
Wortham

[11] 4,259,785
[45] Apr. 7, 1981

[54] MARKING TEMPLATE FOR WALL COVERINGS

[76] Inventor: Robert F. Wortham, 422 E. Highland Ave., Sierra Madre, Calif. 91024

[21] Appl. No.: 58,173

[22] Filed: Jul. 17, 1979

[51] Int. Cl.³ .......................... G01B 3/00; B26F 1/24
[52] U.S. Cl. ................................ 33/189; 33/174 G; 33/180 R; 33/DIG. 10; 30/366
[58] Field of Search ............... 33/189, 197, DIG. 10, 33/174 G, 180 R; 30/366, 368

[56] References Cited

U.S. PATENT DOCUMENTS

| | | |
|---|---|---|
| 2,775,812 | 1/1957 | Mohr . |
| 2,788,151 | 4/1957 | Shore . |
| 2,898,688 | 8/1959 | Cottar ........................... 33/197 X |
| 3,116,563 | 1/1964 | Gelbman . |
| 3,279,080 | 10/1966 | Stepshinski ................... 33/DIG. 10 |
| 3,745,664 | 7/1973 | Altseimer . |
| 3,823,754 | 7/1974 | Nix ............................... 33/DIG. 10 |
| 3,888,013 | 6/1975 | Benoit . |
| 3,913,235 | 10/1975 | Tenneson . |
| 3,924,331 | 12/1975 | Goosen . |
| 3,940,857 | 3/1976 | Giordano . |
| 3,943,631 | 3/1976 | Smugor . |
| 3,950,857 | 4/1976 | Zanavich . |
| 4,059,905 | 11/1977 | Wieting . |

Primary Examiner—William D. Martin, Jr.
Attorney, Agent, or Firm—Roylance, Abrams, Berdo, & Farley

[57] ABSTRACT

A marking template for marking the location on a wall covering of both electrical outlets and electrical switches located in the wall to be covered. The template can be supported by either the single support screw for an outlet trim plate or the two support screws for a switch trim plate. The template comprises a base plate having a central aperture, two tabs thereon for receiving the outlet trim plate support screws, and a pivotable bar for receiving the switch trim plate support screw. Four pins extending from the template mark the wall covering. When the template is used on a switch, the bar is pivoted out of the way of the switch toggle.

10 Claims, 9 Drawing Figures

MARKING TEMPLATE FOR WALL COVERINGS

FIELD OF THE INVENTION

The present invention relates to a marking template for making cut-outs in a wall covering, such as paneling and wall paper, corresponding to the location of electrical switches and outlets in the wall to be covered.

PRIOR ART

In installing wall coverings, such as wood paneling or heavy wall paper, it is quite important to accurately locate on the blind side of the covering the position of both electrical outlets and switches on the wall to be covered so that suitable cut-outs can be formed in the covering for access to these switches and outlets. In the past, these locations have been determined merely by taking measurements on the wall to be covered and translating these measurements to the blind side of the wall covering. However, this method is very imprecise, leading to potential incorrect location on the wall covering. In order to overcome this problem, various devices have been provided in the prior art; however, these have numerous disadvantages. Many of the prior art devices can only be used either for an electrical outlet or for an electrical switch, thereby requiring two separate devices. In addition, many of these prior art devices are of a complicated construction, are complicated to use and are expensive to purchase. They also require additional mounting supports and are time consuming to use. Finally, many of the prior art devices require removal of the switch or the outlet, resulting in a time consuming and complicated process.

Accordingly, a main object of the present invention is to provide a marking template for electrical outlets and switches to mark cut-outs in a wall covering which provides a very precise locating of the desired cut-out area.

Another object of the present invention is to provide such a marking template which can be used for both electrical switches and outlets.

Another object of the present invention is to provide such a marking template which is cheap to manufacture and easy to use.

Another object of the present invention is to provide such a marking template which utilizes the support screws already in place on the trim plates of both the electrical switches and the electrical outlets.

Another object of the present invention is to provide such a marking template which can be utilized without disturbing the electrical switch or outlet.

The foregoing objects are basically attained by providing a device for marking the location on a wall covering of either an electrical outlet or an electrical switch located in the wall to be covered, the combination comprising a base plate; four marking members rigidly supported on the base plate in an array defining a rectangle with each of said members located in a corner of the rectangle; means defining an aperture in the center of the base plate; means defining a top and a bottom bore in the base plate adapted to receive the mounting screws of an electrical wall switch trim plate; a bar having a central bore therein adapted to receive the mounting screw of an electrical wall outlet trim plate; and means for supporting the bar in a first position spanning the center of the aperture and a second position spaced from the center of the aperture.

Preferably, the base plate is a conventional trim plate having a central aperture cut therein and four pointed pins extending therefrom in the proper rectangular array. A pivotable bar is supported in the middle of the base plate for receiving the mounting screw of an electrical outlet so as to secure the template in place. Two tabs extend from the base plate for receiving the two mounting screws of an electrical switch. In this case, the bar is pivoted out of the way of the extending switch toggle.

Thus, the marking template of the present invention is easily and cheaply manufactured, is usable with both electrical switches and outlets, and can be quickly and accurately utilized to provide the required marking of a wall covering.

Other objects, advantages and salient features of the present invention will become apparent from the following detailed description, which, taken in conjunction with the annexed drawings, discloses a preferred embodiment of the present invention.

DRAWINGS

Referring now to the drawings which form a part of this disclosure:

DETAILED DESCRIPTION

Figure 2:
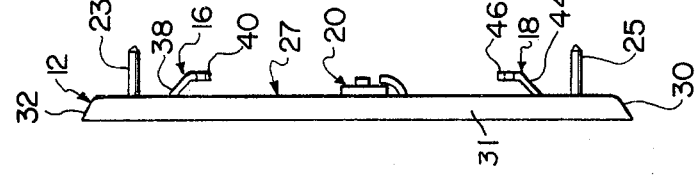
FIG. 2 is a left side elevational view of the template shown in FIG. 1.
Figure 1:
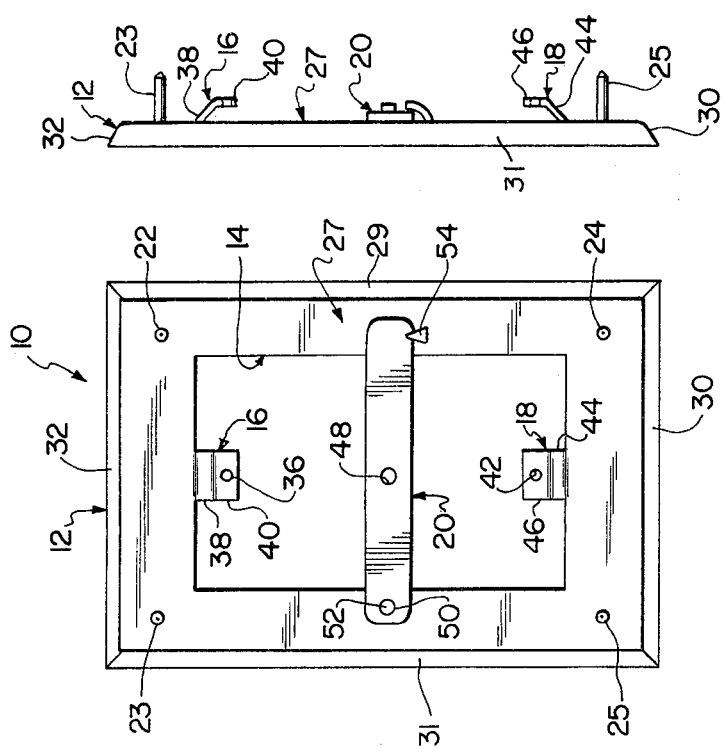
FIG. 1 is a front elevational view of the marking template in accordance with the present invention.

Referring now to the drawings in further detail, the marking template 10 of the present invention as seen in FIGS. 1 and 2 comprises a rectangular base plate 12, a central aperture or cut-out 14 therein, a top tab 16, a bottom tab 18, a pivotable bar 20 and four marking members or pins 22–25.

Figure 5:
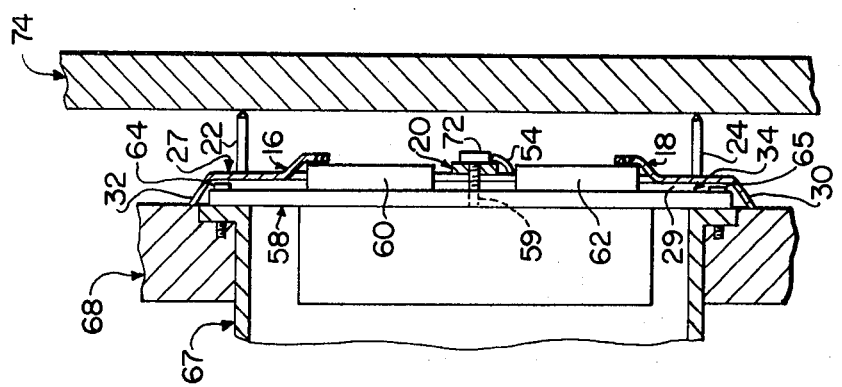
FIG. 5 is a left side elevational view in section taken along lines 5—5 in FIG. 4 showing a wall covering being marked by the marking template of the present invention.

The base plate 12 can be a conventional trim plate for electrical switches and outlets having the substantially rectangular central aperture 14 cut therefrom with the tabs 16 and 18 extending integrally from the base plate and overlying the aperture. As seen in FIGS. 1 and 2, the front face 27 of the base plate is substantially planar with depending sides 29, 30, 31 and 32 bordering the front face and extending away from the plane of the front face to define an internal cavity 34, as seen in FIG. 5.

The four marking pins 22–25 are rigidly supported on the front face of the base plate in an array defining a rectangle with each of the pins being located in a corner of the rectangle. The dimensions of this rectangle are the same as the desired cut-out to be made in the wall covering. These pins are preferably pointed at their distal ends to make a precise marking in the wall covering.

The top tab 16 extends integrally from the base plate, overlies the central aperture 14 and has a top bore 36 therein. This tab comprises a first portion 38 extending generally upwardly from the base plate and outwardly over the central aperture and a second portion 40 integrally formed with the first portion and extending substantially parallel to the front face of the base plate. The top bore 36 is located in this second portion 40.

Similarly, the bottom tab 18 extends integrally from the base plate, overlies the central aperture and has a bottom bore 42 therein. This bottom tab is comprised of a first portion 44 extending generally upwardly and outwardly from the base plate with which it is integrally formed and a second portion 46 extending substantially parallel to the base plate and integrally formed with the first portion thereof, the second portion having the bottom bore 42 therein.

Figure 7:
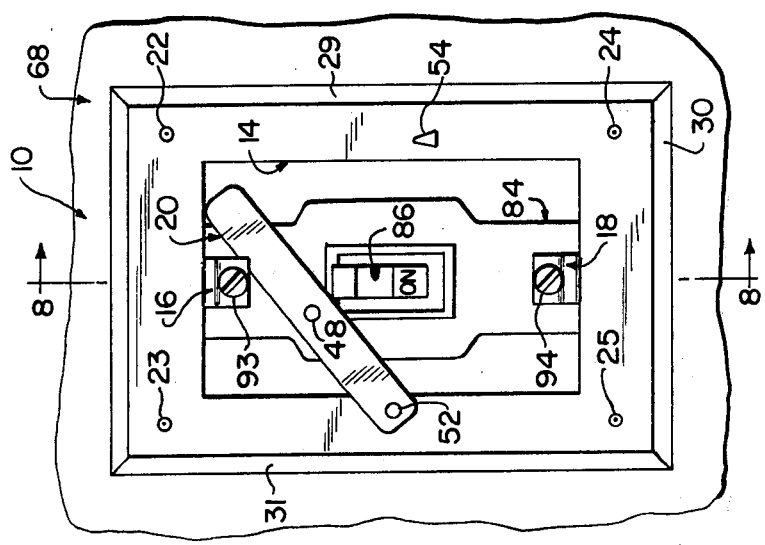
FIG. 7 is a front elevational view of the electrical switch shown in FIG. 6 with the marking template in accordance with the present invention secured thereto with the trim plate having been removed therefrom.

The pivotable bar 20 has a central bore 48 therein and on its left end as seen in FIG. 1 has a support aperture 50 receiving a support pin 52 rigidly supported on the front face of the base plate to pivotally support the bar. This support pin is preferably a rivet. The other end of the bar 20 is releasably received in a catch notch 54 formed by cutting a portion of the base plate and elevating that cut portion about a hinge line. This notch releasably receives the bar 20 in the position shown in FIGS. 1 and 2. Thus, the bar is supported by the aperture 50, pin 52 and notch 54 so that in a first position shown in FIGS. 1 and 2 it spans the center of the central aperture 14 while it can be pivoted out of that position so that it is spaced from the center of the aperture as seen in FIG. 7, to provide space for the switch toggle, as described in more detail hereinafter.

OPERATION

Figure 4:
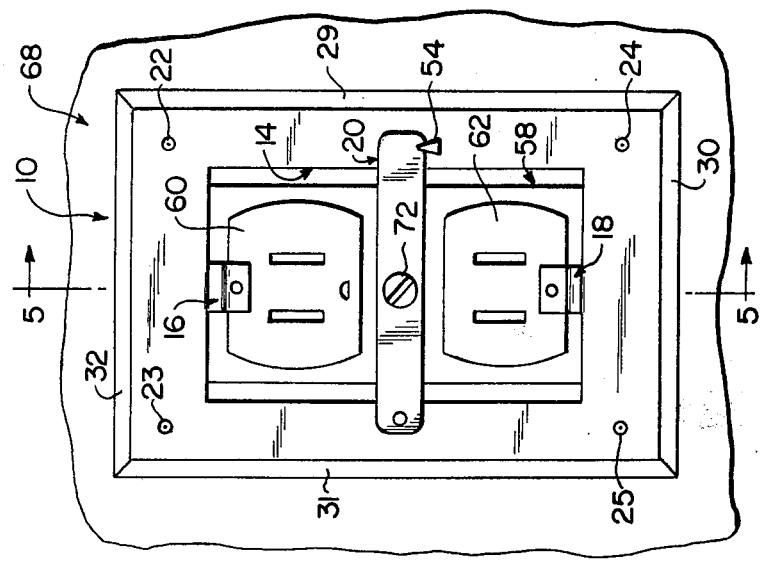
FIG. 4 is a front elevational view of the electrical outlet shown in FIG. 3 having the marking template in accordance with the present invention secured thereto after removal of the trim plate.
Figure 3:
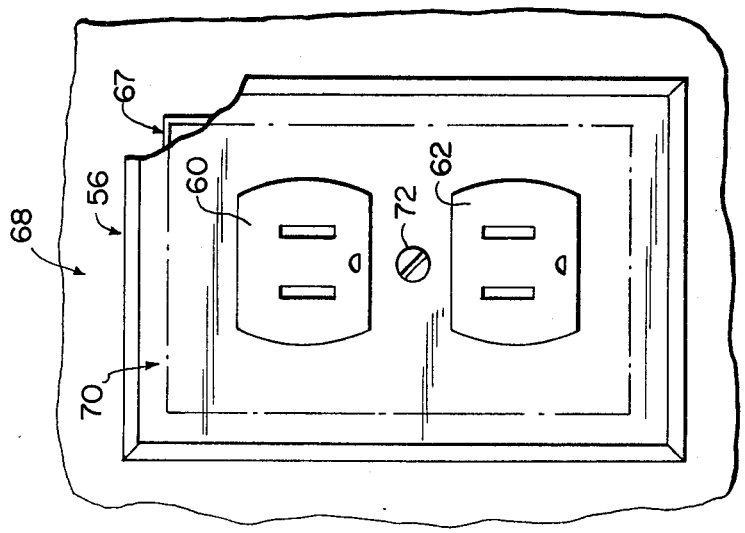
FIG. 3 is a front elevational view with a portion cut away showing a conventional duplex electrical outlet secured in a connection box in a wall having a conventional trim plate thereon.

As seen in FIGS. 3, 4 and 5, the marking template 10 of the present invention can be utilized in conjunction with a conventional duplex electrical outlet 56. As seen in FIGS. 3 and 5, the outlet 56 is comprised of a support plate 58 and upper and lower sockets 60 and 62. The support plate has suitable bores at the top and the bottom for mounting of that plate by means of screws 64 and 65 into a conventional connection box 67 supported in the wall 68, which is the wall to be covered.

As seen in FIG. 3, a conventional trim plate 70 has suitable apertures therein for receiving the extending sockets 60 and 62 and is supported to the support plate 58 of the outlet by means of a suitable bore 59 in the support plate (see FIG. 5) and a suitable central bore in the trim plate, both of which receive a mounting screw 72.

Basically, the rectangular cut out to be formed in the covering of wall 68 has the dimensions substantially corresponding to the rectangular outline of the connection box 67 as shown in phantom in FIG. 3.

In order to utilize the marking template in accordance with the present invention, first mounting screw 72 is removed so that the trim plate 70, as seen in FIG. 3, can be removed from the outlet 56. Once this is accomplished, the marking template 10, with the bar 20 in the position shown in FIG. 1, is placed up against the now bare outlet 56 so that the central bore 48 in bar 20 is aligned with the central bore 59 in the outlet support plate 58. Then, the mounting screw 72 previously used for the trim plate is maneuvered through central bore 48 in the bar 20 and fastened to the support plate 58 so that the marking template 10 is in the position shown in FIGS. 4 and 5 flush against wall 68. As seen in FIG. 5, in this position the sockets 60 and 62 do not block the flush positioning of the template 10 since the tabs 16 and 18 are partially elevated out of the plane of the front face 27 of the base plate 12 and the sockets extend into the area defined by the central aperture 14.

Figure 9:
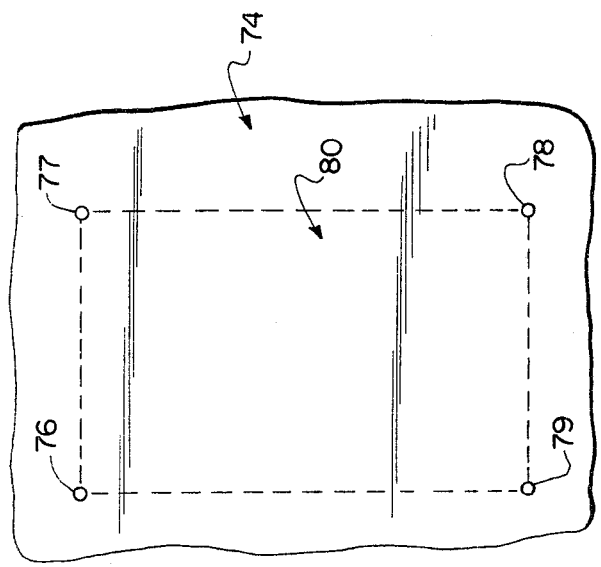
FIG. 9 is an elevational view of a wall covering having been marked by the marking template of the present invention as demonstrated in FIGS. 5 and 8.

With the marking template 10 in the position shown in FIGS. 4 and 5, the wall covering 74 shown in FIG. 5 is positioned against the wall 68 in the orientation it will ultimately maintain once permanently connected to wall 68. For example, if the wall covering were a wood panel, it could be lightly fastened by nails at the ceiling area and then draped against the remaining lower portion of the wall. In all events, the wall covering 74 is pressed up against the extending pins 22–25 which make a suitable marking on the blind side of the covering 74. This marking is shown in FIG. 9 as four indentations 76–79 in a rectangular array resulting from the pointed tips of pins 22–25. If the wall covering is soft enough, rather than mere indentations, a complete bore could be provided by each of the pins. In all events, after the wall covering 74 is removed from its temporary locating position, a rectangular cut out 80 can be made in covering 74 by cutting along the dashed lines forming a rectangle based on the indentations 76–79. When the wall covering 74 is permanently placed against the wall 68, the outlet 56 including the support plate 58 can be maneuvered through the cut out 80 and firmly attached to the covering as desired.

Figure 8:
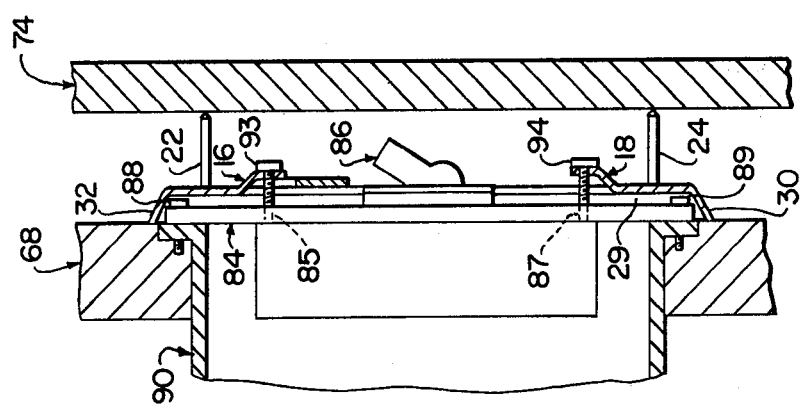
FIG. 8 is a left side elevational view in section taken along lines 8—8 in FIG. 7 showing a wall covering being marked by the marking template of the present invention.
Figure 6:
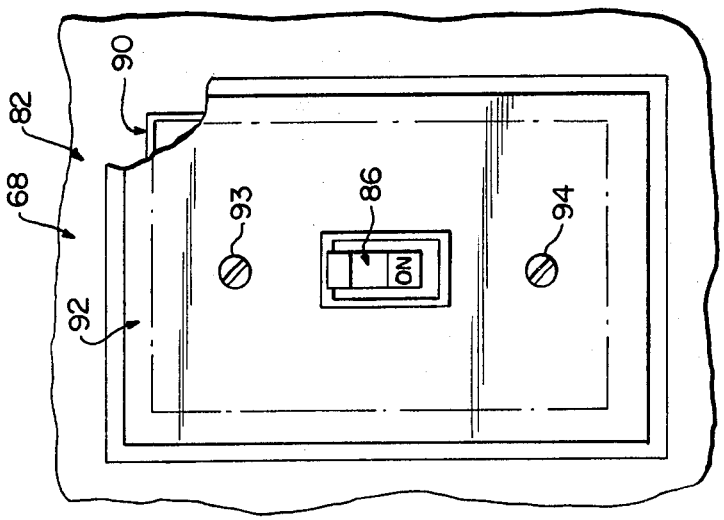
FIG. 6 is a front elevational view with a portion cut away showing a conventional electrical switch received in a connection box in a wall having a conventional trim plate thereon.

Referring now to FIGS. 6–8, the marking template 10 of the present invention is also usable with a conventional electrical switch 82 comprising a support plate 84 and an on and off toggle 86. The support plate 84 is supported by means of screws 88 and 89, as seen in FIG. 8, to a connection box 90 received in wall 68. As seen in FIG. 6, the electrical switch 82 is conventionally covered by a trim plate 92 supported thereon by mounting screws 93 and 94 above and below toggle 86, which screws pass through suitable apertures in the trim plate and are suitably secured in threaded bores 85 and 87 in the support plate 84 as seen in FIG. 8, all in a conventional manner.

In order to provide a marking on the blind side of the wall covering 74 corresponding to the location of electrical switch 82 in a configuration substantially the same as the outline of connection box 90, the trim plate 92 is first removed by removing mounting screws 93 and 94.

Then, the marking template 10 of the present invention is placed over the switch 82 with the bar 20 pivoted out of the position shown in FIG. 1 into a second position shown in FIG. 7 in which the bar is spaced from the center of the central aperture 14 therein. This provides for suitable space for the toggle 86 to extend through and beyond the central aperture 14, as seen specifically in FIG. 8. Then, the mounting screws 93 and 94 from the trim plate 92 are manipulated through the top and bottom bores 36 and 42 in tabs 16 and 18, as seen in FIG. 7, so that they are received in the suitable preexisting threaded bores 85 and 87 in support plate 84, as seen in FIG. 8. With this accomplished, the wall covering 74 is manipulated as described above so that the appropriate area on the wall covering which will be adjacent switch 82 is maneuvered thereagainst so that pins 22-25 can suitably mark the required rectangular area, as demonstrated in FIG. 9. Once this is accomplished, the marking template 10 is removed, the wall covering 74 is placed in its final position, the switch 82 is pulled through the cut out thereby formed and secured to the wall covering 74. Then the trim plate 92 is repositioned over the switch 82.

While one advantageous embodiment has been chosen to illustrate the invention, it will be understood by those skilled in the art that various changes and modifications can be made therein without departing from the scope of the invention as defined in the appended claims.

What is claimed is:

1. A device for marking the location on a wall covering of either an electrical outlet or an electrical switch located in the wall to be covered, the combination comprising:
    a base plate;
    four marking members rigidly supported on said base plate in an array defining a rectangle with each of said members located in a corner of the rectangle;
    means defining an aperture in the center of said base plate;
    means defining a top and a bottom bore in said base plate adapted to receive the mounting screws of an electrical wall switch trim plate;
    a bar having a central bore therein adapted to receive the mounting screw of an electrical wall outlet trim plate; and
    means for supporting said bar in a first position spanning the center of said aperture and a second position spaced from the center of said aperture.

2. A device according to claim 1, wherein said means defining a top and a bottom bore comprises
    a first tab extending from said base plate, overlying said aperture and having said top bore therein, and
    a second tab extending from said base plate, overlying said aperture and having said bottom bore therein.

3. A device according to claim 2, wherein
    said first tab comprises a first portion extending upwardly from said base plate and a second portion extending substantially parallel to said base plate, said second portion having said top bore therein.

4. A device according to claim 3, wherein
    said second tab comprises a first portion extending upwardly from said base plate and a second portion extending substantially parallel to said base plate, said second portion having said bottom bore therein.

5. A device according to claim 1, wherein said means for supporting includes
    means for pivotally mounting one end of said bar on said base plate.

6. A device according to claim 5, wherein said means for supporting further includes
    means, on said base plate, for releasably receiving the other end of said bar.

7. A device according to claim 1, wherein said means for supporting includes
    a support pin rigidly secured to said base plate,
    said bar having a support aperture at one end for receiving said support pin.

8. A device according to claim 7, wherein said means for supporting further includes
    a catch in said base plate for receiving the opposite end of said bar therein.

9. A device according to claim 1, wherein
    said base plate aperture is substantially rectangular.

10. A device according to claim 1, wherein said marking members are pointed pins.

* * * * *